US012674664B2

(12) United States Patent
Winter et al.

(10) Patent No.: US 12,674,664 B2
(45) Date of Patent: Jul. 7, 2026

(54) METHOD AND DEVICE FOR A PHOTOGRAMMETRIC MEASUREMENT

(71) Applicant: Carl Zeiss GOM Metrology GmbH, Braunschweig (DE)

(72) Inventors: Tim Winter, Braunschweig (DE); Eric Oertel, Braunschweig (DE)

(73) Assignee: Carl Zeiss GOM Metrology GmbH, Braunschweig (DE)

( * ) Notice: Subject to any disclaimer, the term of this patent is extended or adjusted under 35 U.S.C. 154(b) by 0 days.

(21) Appl. No.: 18/914,005

(22) Filed: Oct. 11, 2024

(65) Prior Publication Data

US 2025/0035440 A1     Jan. 30, 2025

Related U.S. Application Data

(63) Continuation of application No. PCT/EP2022/059864, filed on Apr. 13, 2022.

(51) Int. Cl.
*G01C 11/30*       (2006.01)
*G01C 11/02*       (2006.01)
*G06T 7/73*        (2017.01)

(52) U.S. Cl.
CPC ............ *G01C 11/30* (2013.01); *G01C 11/025* (2013.01); *G06T 7/73* (2017.01); *G06T 2207/30204* (2013.01)

(58) Field of Classification Search
CPC ....... G01C 11/30; G01C 11/025; G01C 11/06; G01C 15/002; G01C 11/02; G06T 7/73; G06T 2207/30204; G01B 11/25

(Continued)

(56) References Cited

U.S. PATENT DOCUMENTS

2010/0134598 A1* 6/2010 St-Pierre ............ G01B 11/2513
                                                   348/47
2012/0285024 A1* 11/2012 Miller ..................... G01C 11/04
                                                   33/1 A
(Continued)

FOREIGN PATENT DOCUMENTS

DE     102020132179 A1     6/2022
EP        3650807 A1 *     5/2020    ............ G01B 11/25
EP        4019890 A2       6/2022

OTHER PUBLICATIONS

International Preliminary Report on Patentability and Written Opinion of the European Patent Office in PCT/EP2022059864 (on which this application is based) dated Oct. 8, 2024 and English-language translation thereof.

*Primary Examiner* — Asmamaw G Tarko
(74) *Attorney, Agent, or Firm* — Ewers IP Law PLLC; Falk Ewers

(57) ABSTRACT

A method and a device for a photogrammetric measurement of measurement features are provided. The device has a multi-camera with at least two individual cameras. A field of vision of at least two of the individual cameras partly overlaps. The method includes capturing images of the measurement features with at least two individual cameras of the multi-camera at different measurement positions, analyzing the captured images of one measurement position and determining 3D identification features of measurement features in the three-dimensional space, the measurement features being located in the overlap region of the individual cameras, using the plurality of captured images for the overlap region and the respective location of each measurement feature in the captured images, identifying the measurement features in the captured images captured from different measurement positions with matching 3D identification features, and calculating the 3D coordinates of the (Continued)

identified measurement features using the plurality of captured images.

20 Claims, 4 Drawing Sheets

(58)  Field of Classification Search
USPC ........ 348/135, 148; 382/103, 104, 106, 128, 382/131, 154
See application file for complete search history.

(56)  References Cited

U.S. PATENT DOCUMENTS

| | | | |
|---|---|---|---|
| 2013/0193855 A1* | 8/2013 | Bauer .................... | H05B 47/18 |
| | | | 315/151 |
| 2014/0015930 A1* | 1/2014 | Sengupta .............. | G06F 21/316 |
| | | | 348/46 |
| 2016/0209217 A1* | 7/2016 | Babu .................... | G05D 1/0251 |
| 2020/0408510 A1* | 12/2020 | Drouin ................. | G01B 11/002 |
| 2022/0397686 A1* | 12/2022 | Scacchi ................ | G01S 19/485 |

* cited by examiner

METHOD AND DEVICE FOR A PHOTOGRAMMETRIC MEASUREMENT

CROSS REFERENCE TO RELATED APPLICATIONS

This application is a continuation application of international patent application PCT/EP2022/059864 filed on Apr. 13, 2022, designating the United States and the entire content of this application is incorporated herein by reference.

TECHNICAL FIELD

The disclosure relates to a photogrammetric measurement method, and to a photogrammetric measurement device.

BACKGROUND

Optical methods and optical measuring systems are widespread in industrial metrology. Photogrammetric measurement methods are an example hereof.

Conventional photogrammetric methods are configured to determine the three-dimensional coordinates of measurement features, for example applied or natural markings on an object, from images recorded photographically.

Typically, a camera is used to record images from different positions or angles with respect to the object. Subsequently, the measurement features are identified in these images, their image coordinates are determined, and 3-D coordinates of the measurement features are calculated with the aid of mathematical algorithms. For reasons of identification, the measurement features might be provided with an unambiguous ID, for example a number.

High precision is in demand in industrial applications. Thus, markers, which for example are applied to the object, are often used as measurement features in industrial photogrammetry. These markers, which are often also referred to as markings, reference markers, photogrammetric targets or optical targets, are advantageously configured such that they can be identified in the image recordings by using digital image processing methods and their position can be determined very accurately.

In order to easily unambiguously assign markers in the image recordings from different views, use is frequently made of coded markers which are configured such that they can be unambiguously identified by image processing algorithms in the image recordings on account of their code.

However, the use of coded markers is not always advantageous.

Thus, on account of their code, coded markers are usually larger than uncoded markers, whereby larger portions of the object surface might be concealed by the coded markers.

If image processing algorithms for identifying the markers are used, care must always be taken that none of the codes are present multiple times in order to enable an unambiguous identification.

SUMMARY

It is an object of the disclosure to provide an improved method and an improved device for photogrammetrically measuring measurement features. Thereby, it should be possible in particular to determine the three-dimensional coordinates of measurement features in the form of uncoded markers that are located on an object.

The object is achieved by a method for photogrammetrically measuring measurement features and by a device for three-dimensional optical measurement of measurement features as described herein.

In order to measure the measurement features, a device having a multi-camera is used to record images of the measurement features. The multi-camera has at least two cameras. The configuration of the multi-camera is known at least approximately. For example, the configuration can be derived from known structural conditions of the multi-camera. The configuration is advantageously determined by calibration. For example, the configuration might contain the positions and orientations of the individual cameras in relation to one another, and their conjugate image equations. For example, the cameras are matrix cameras.

When recording images, the individual cameras of the multi-camera can advantageously be triggered simultaneously.

Each individual camera of the multi-camera has its own field of view. In this context, the individual cameras are arranged relative to one another such that the fields of view of at least two individual cameras of the multi-camera overlap at least in part and thus form an overlapping field of view, which is also referred to as a region of overlap.

It is proposed to record a plurality of images of measurement features, for example of an object provided with measurement features, from different positions and angles with the multi-camera in order to calculate the 3-D coordinates of the measurement features.

Once an image has been recorded by the multi-camera from one measurement position, at least two image recordings are available for measurement features located in the region of overlap of at least two individual cameras.

For example, the measurement features can be uncoded markers which are attached to an object surface. As a rule, conventional methods rely on the use of coded markers in this case. By contrast, the method according to an aspect of the disclosure requires no such coding for the markers.

In the region of overlap, the measurement features can be assigned in the cameras by exploiting the configuration of the multi-camera and the epipolar geometry. Subsequently, the 3-D coordinates of these measurement features can be determined in a sensor coordinate system by way of triangulation.

In the sensor coordinate system, these measurement features for example have identification features, such as distances, angles or enclosed areas, relative to one another. At least some of these identification features are unique to a measurement feature or a group of measurement features. By utilizing the configuration of the multi-camera, such identification features can be determined among markers in three-dimensional space (3-D identification features) on the basis of images recorded by the multi-camera from a single measurement position.

However, the multi-camera is not used in only a single measurement position; instead, it is used in various measurement positions.

The measurement features can be identified in the image recordings from different measurement positions by way of the previously determined unique features. Once a marker was unambiguously identified, it can be labeled for further processing by way of being allocated an unambiguous ID, for example a marker number.

Once at least some of the markers have been identified in a plurality of images, the actual photogrammetric calculation of their precise 3-D coordinates is carried out. To this end, the unknowns of a three-dimensional model, which includes, e.g., the positions, orientations, and conjugate image equations of the individual image positions, and the 3-D coordinates of the markers as unknowns, can be determined with the aid of a mathematical fit such that, e.g., the squared deviations between the mathematical model and the ascertained image coordinates are minimized. In photogrammetry, such a calculation step is referred to as a bundle adjustment.

In particular, this fitting can be carried out using only the 2-D image coordinates of the measurement features, their unambiguous identification, the imaging properties of the individual cameras and possible error metrics.

The solution of the bundle adjustment supplies global 3-D coordinates, albeit without an unambiguous scaling. That is to say, the overall system can be scaled without changing the deviation.

This scaling problem can be solved by virtue of introducing a scale into the system. There are different options to this end.

One exemplary embodiment makes use of the fact that the configuration of the multi-camera is sufficiently well known. For example, in order to determine the configuration, the measuring device can be calibrated before or after the measurement of the object. Then a scale can be introduced into the system by way of the 3-D coordinates calculated with the aid of the configuration.

In an exemplary embodiment, at least one scale-providing element (scale) is used on or next to the object, with at least one dimension of the scale being known. Scaling of the system can be performed using the known dimension. Scaling by making use of the known configuration of the multi-camera, possibly performed in advance, can be improved thereby in terms of its accuracy.

In an exemplary embodiment, the scale-providing element can be a scale with uncoded markers. For example, scales with uncoded markers can be identified in the measurement by way of their known spacings and can be subsequently used for fitting. For example, the uncoded markers can have the same structure as the uncoded markers used as measurement features on the object. Hence, the uncoded markers from the scale cannot readily be distinguished from the other measurement features. For the measurement features, spacings from other measurement features can be determined on the basis of the configuration of the multi-camera. Scale errors may occur here since the configuration of the multi-camera is only known sufficiently well. The measurement features with the spacing value most similar to a known spacing value for the uncoded markers from the scale can be searched for in the set of the measurement features. This allows the uncoded markers from the scale to be identified, and the present spacing value can be replaced by the known dimension.

In a further exemplary embodiment, a scale-providing element with coded markers is used. In particular, this simplifies an unambiguous identification of the scales. This is particularly advantageous if the configuration of the multi-camera is only known very approximately.

In an extension of the method, it is not only the image information regarding markers in the overlapping fields of view of at least two image recording units that is used, but 3-D positions can also be created for markers appearing outside of these regions in measurement images. These markers are not unambiguously identified in the first step as 3-D features cannot be calculated therefor via triangulation. However, they are included in the subsequent fit as non-identified markers and thus represent additional conditions for the fit, which might increase the resultant accuracy.

In another exemplary embodiment of the method, coded markers can also be used in addition to the uncoded markers utilized for the method. The method according to an aspect of the disclosure precisely allows coded markers to be dispensed with. However, additional coded markers, should they nevertheless be present, do not interfere with the method. A code present can simply be ignored, and so this marker is included in the procedure like an uncoded marker. However, it is also possible to combine the information obtained from the method with the code information.

It is advantageous to use an illumination source when images are recorded by the multi-camera. The illumination unit enables the illumination of the markers, and so these can be better detected in the image recordings, for example on account of an increased contrast.

The markers can be embodied with retroreflective materials. These materials reflect light precisely into the direction from where it was sent. An improved light yield is possible if the illumination is attached directly to the optics of the image recording unit.

Illumination can be implemented with light of different wavelengths. In this case, the illumination wavelength also influences the focal position of the camera. Thus, the use of different wavelengths with an unchanging camera configuration allows measurement features at different working distances from the camera to be recorded in focus.

The multi-camera is combined with a 3-D scanner in an exemplary embodiment. To this end, a 3-D scanner is securely connected to the multi-camera.

The 3-D scanner is configured to capture three-dimensional measurement data of an object. In particular, structured-light scanners and laser line scanners are well suited to this combination. It is often not possible to capture all faces of an object with the 3-D scanner from a single recording perspective. Thus, for complete capture, the object to be measured is generally captured from a plurality of positions of the measuring device relative to the object. Known methods include those in which reference markers are placed on or in the spatial vicinity of the object prior to the 3-D measurement, for example in order to combine the measurement data from individual measurements of the 3-D scanner to make an overall data record. Advantageously, the markers used for the photogrammetric measurement with the multi-camera are also used for the measurement with the 3-D scanner.

In a further exemplary embodiment, there is not only a combination of multi-camera and 3-D scanner but even an integrative configuration.

The fact that 3-D scanners often also make use of cameras is utilized here. Hence, a joint use of the cameras for the multi-camera and 3-D scanner is conceivable.

For example, a sensor having two cameras is conceivable, in the case of which the method according to an aspect of the disclosure is carried out using the identical cameras, and an areal 3-D measurement is subsequently carried out, the latter in turn using the results of the method according to the disclosure.

The measuring procedures for the multi-camera and 3-D scanner can be implemented in succession or else in temporally mixed fashion. The measurement positions which the multi-camera and 3-D scanner adopt in relation to the measurement objects might differ. In particular, the working distance for the photogrammetric measurement can differ from the working distance for the measurement using the 3-D scanner. It is advantageous if the photogrammetric measurement is implemented at a larger working distance.

Especially the wavelength dependence of refraction in camera lenses can be utilized in order to obtain a better sharpness for the imaging at different working distances. To this end, the measurement features for the photogrammetric method can advantageously be illuminated using a different wavelength to the wavelength utilized when the 3-D scanner is used. The combination of blue and infrared light is advantageous.

BRIEF DESCRIPTION OF THE DRAWINGS

The disclosure will now be described with reference to the drawings wherein.

DESCRIPTION OF EXEMPLARY EMBODIMENTS

Figure 1:
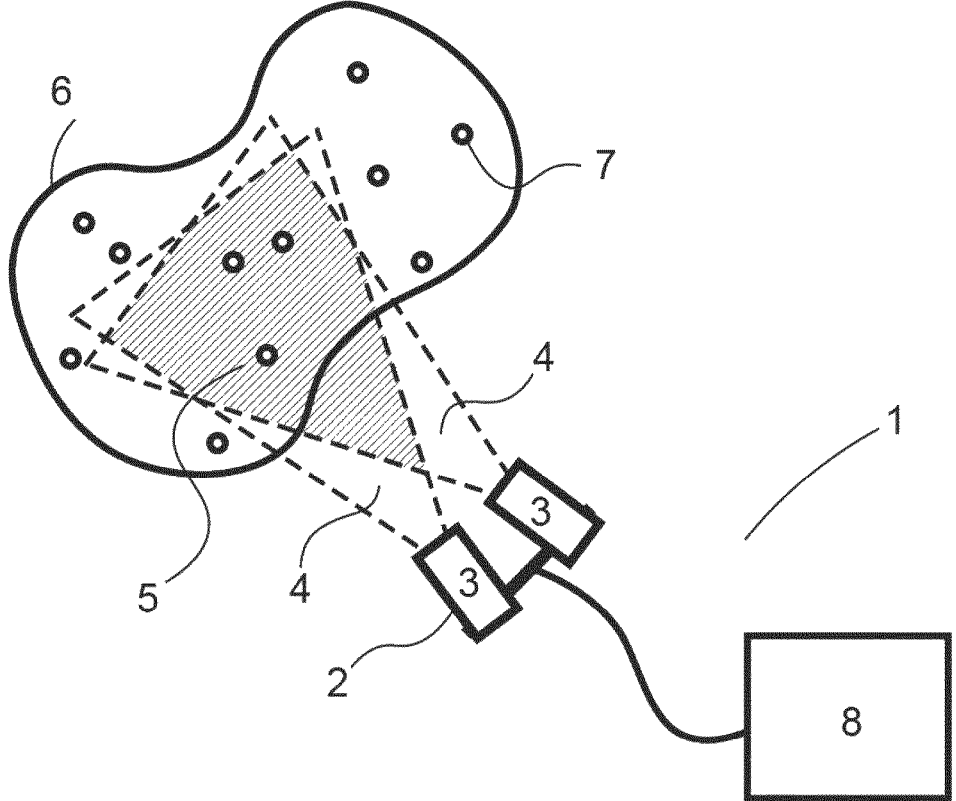
FIG. 1 shows a sketch of a measuring device.

FIG. 1 shows an exemplary embodiment of a measuring device 1 which is configured to conduct a method according to the disclosure. The measuring device 1 has a multi-camera 2, which has two individual cameras 3 connected to one another. The geometric relationship of the individual cameras 3 to one another is known. The fields of view 4 of the individual cameras 3 overlap. The region of overlap 5 is illustrated by a hatching.

The multi-camera 2 can have even more cameras 3 in further exemplary embodiments, with only the fields of view 4 of at least two cameras 3 needing to overlap.

The multi-camera 2 is configured to make recordings of an object 6, to which measurement features 7 have been applied. For example, these measurement features 7 can be stuck-on markers or markers attached in any other way, or else natural markings, for example edges or spots of color. The measurement features 7 are advantageously uncoded markers. The recordings are evaluated in an evaluation unit 8 in order to determine the 3-D coordinates of the measurement features 7.

Should markers be attached to the object, they should have a fixed relationship with the object over the duration of a measurement. This is achievable using different methods of attachment. The use of adhesives, magnets, suction cups or else adhesive films, for example, is customary.

Figure 2:
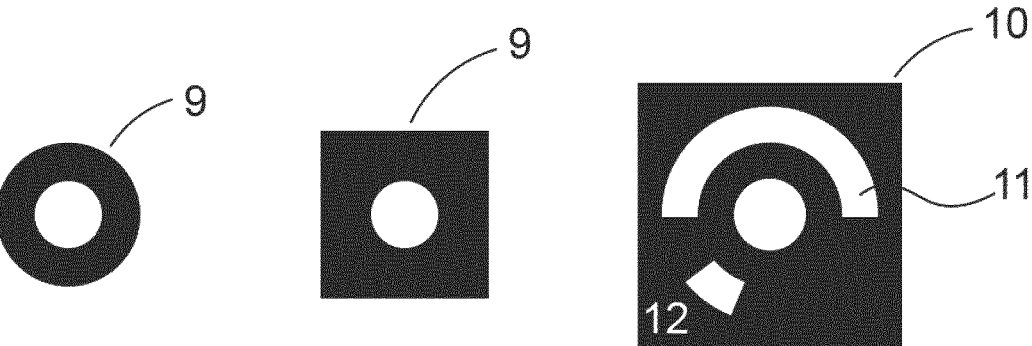
FIG. 2 shows a sketch of marker types.

FIG. 2 shows examples of different types of markers. The markers used in industrial metrology can in principle include measurement features of any shape. The configuration of a measurement feature as a geometric shape, e.g. as a circle, is customary. Frequently utilized embodiments of uncoded markers 9 include concentric circles with complementary coloring, for example white on black, or the use of a bright circle on a dark background.

In contrast to the uncoded marker 9, a coded marker 10 contains an exclusive feature which distinguishes it from other markers. To this end, the embodiment of a coded marker 10 depicted here comprises a specific pattern in the form of a ring code 11 in the direct vicinity of a circle.

The use of uncoded markers 9 is advantageous as they are small and, on account of their similarity, can generally be produced cheaply and easily.

Coded markers 10 can be unambiguously identified by a code 11. Disadvantages of the coding 11 include the increased space requirement, the more complicated production and the necessity for decoding. Moreover, the user must take care that each code 11 only occurs once within a measurement project as ambiguities could otherwise arise.

For example, the markings are encoded by way of their spacings from one another within the method according to an aspect of the disclosure. For example, this allows the advantageous uncoded markers 9 to be used.

Figure 3:
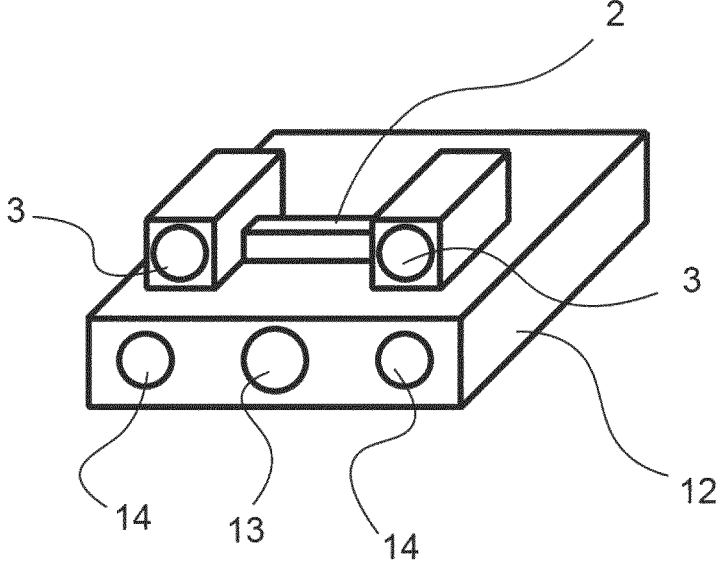
FIG. 3 shows a sketch of a combination of a multi-camera and a 3-D scanner.

FIG. 3 shows an advantageous embodiment in which the multi-camera 2 is connected to a 3-D scanner 12 in the form of a topometric sensor 12.

For example, a topometric sensor 12 could be a structured-light scanner or a laser scanner. For example, an exemplary embodiment in which the 3-D scanner 12 has a projector 13 and two image recording units 14 is depicted here. An advantage of connecting a multi-camera 2 and a 3-D scanner 12 to one another is that, for the orientation of individual measurements, the 3-D scanner 12 can use the measurement features 7 calibrated by the multi-camera 2 in accordance with the method according to an aspect of the disclosure. In this context, it is particularly advantageous if the field of view 5 of the multi-camera 2 is significantly larger than the field of view of the topometric sensor 12. Thus, the field of view 5 of the multi-camera 2 can advantageously be at least 50% larger than the field of view of the topometric sensor 12.

An exemplary embodiment not depicted here, in which one of the image recording units 14 of the topometric sensor 12 is an individual camera of the multi-camera 2 at the same time, is also conceivable. That is to say that the topometric sensor 12 and the multi-camera 2 use at least one camera jointly. In this case, joint use means that recordings for the topometric measurement by the topometric sensor 12 and for the method carried out by the multi-camera 2 can be recorded by this jointly used camera.

Figure 4:
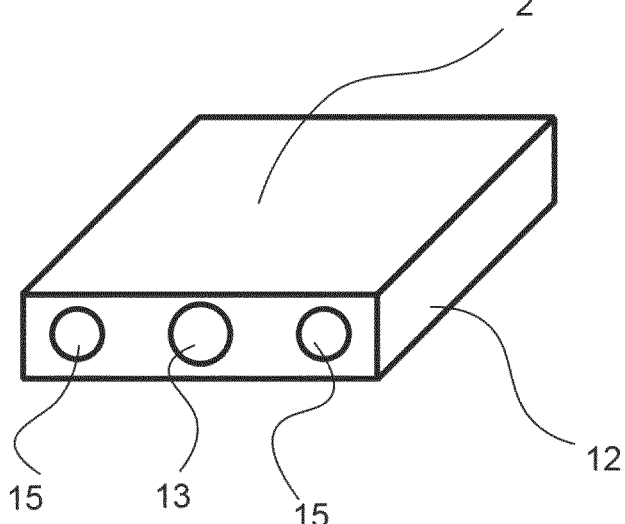
FIG. 4 shows a sketch of an integration of a multi-camera and a 3-D scanner.

FIG. 4 shows an exemplary embodiment, in which the multi-camera 2 and the topometric sensor 12 are integrated in one another. The cameras 15 are individual cameras of the multi-camera 2, and also cameras of the topometric sensor 12 at the same time. Like in the exemplary embodiment shown in FIG. 3, it is advantageous if the measurement features 7 calibrated by the multi-camera 2 can be used by the topometric sensor 12 for orienting individual measurements.

In this case, it is particularly advantageous if the recordings by the multi-camera 2 can be taken at a larger working distance, with the result that the recordings of the multi-camera 2 have a larger field of view than the recordings by the topometric sensor 12. As a result, comparatively many measurement features 7 can be calibrated using a few recordings in the measurement by the multi-camera 2. Subsequently, non-contiguous individual measurements can be oriented directly with respect to one another during the measurement by the topometric sensor 12. Measuring at different working distances can be advantageously developed further by virtue of the fact that illuminations with different wavelengths are used for the measurement by the multi-camera 2 and the measurement by the topometric sensor 12, with the optics of at least one camera 15 thereby creating a sharp image at the respective distances.

In this case, the illumination for the measurement by the multi-camera 2 can be provided by way of an illumination source not shown here. However, the projector 13 can advantageously be used for the illumination during the measurement by the multi-camera 2 and for the measurement by the topometric sensor 12. For example, for the photogrammetric measurement, the measurement features 7 can be illuminated uniformly by light at a wavelength or light of a wavelength spectrum. Advantageously, this can be implemented using light in the infrared wavelength range. During the measurement with the 3-D scanner, the projector can use a different wavelength range, for example blue.

Advantageously, e.g., by appropriately selected optics, the cameras 15 can be configured such that the focal plane for light in the red wavelength range is at a larger distance from the camera than the focal plane for a blue wavelength.

Figure 5:
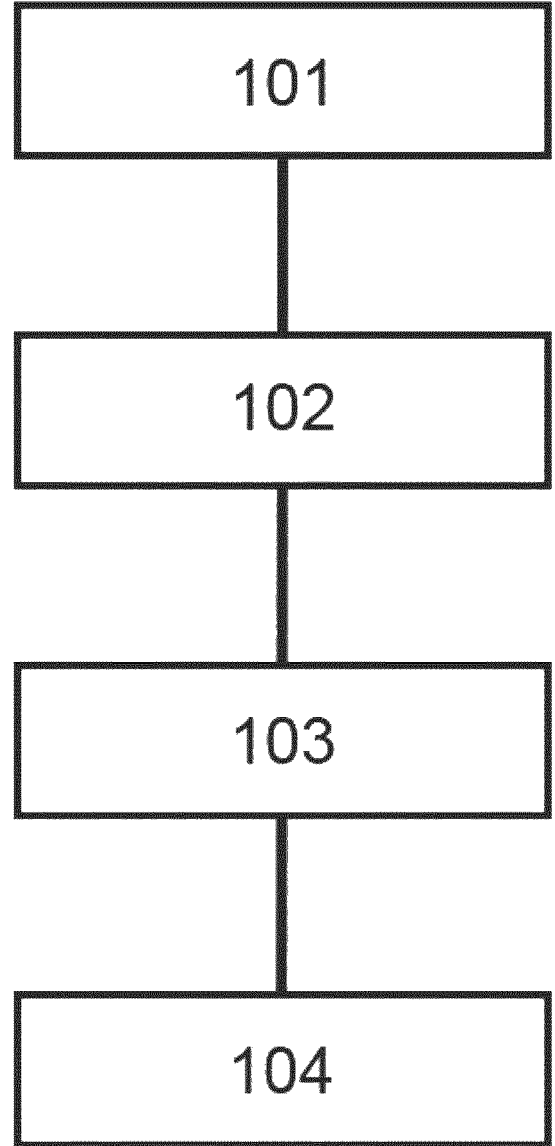
FIG. 5 shows a measuring procedure according to an exemplary embodiment of the disclosure.

FIG. 5 shows a flowchart for schematically illustrating the method according to the disclosure. Some of the method steps explained below need not be obligatory but may represent merely optional method steps.

Step 101: "Recording Images of Measurement Features Using a Device Having a Multi-Camera, in Different Measurement Positions"

For example, the measurement positions differ in terms of the position or the viewing angle of the multi-camera in relation to the measurement features. If it is assumed that the measurement features whose 3-D coordinates should be determined by the method according to an aspect of the disclosure are situated on the surface of an object, then the image recordings can for example be recorded by a user with a multi-camera, with the user moving around the object. Rather than being held by a user, the multi-camera can also be moved around the object using, e.g., a manipulator such as a robotic arm. It is also conceivable that the object is situated on a positioning unit, for example a rotary table, and the multi-camera is held by a stand. Thus, different measurement positions can also be established by rotating the object with the aid of the rotary table.

Step 102: "Evaluating the Image Recordings of a Measurement Position and Determining 3-D Identification Features of the Measurement Features"

It is assumed that the configuration of the multi-camera is sufficiently well known. Advantageously, the configuration is determined by a calibration measurement for the multi-camera. By way of the calibration measurement, it is possible to determine, inter alia, the orientation and positioning of the individual cameras relative to one another, the internal orientation of the cameras and further imaging properties. Hence, by way of triangulation calculations, 3-D coordinates can be determined for measurement features which are situated in a joint field of view of at least two individual cameras of the multi-camera. For example, these 3-D coordinates in relation to an individual measurement are available in a coordinate system which orients itself with respect to structural features of the multi-camera.

In this case, further processing does not rely on the 3-D coordinates themselves; instead, these serve only the determination of 3-D identification features for the measurement feature, for example angles and/or distances with respect to other measurement features. It is customary for the measurement features to be reference markers that are attached on or next to an object. Hence, as a rule, the measurement features are distributed irregularly in space. Hence, different measurement features have a different number of other measurement features in their vicinity. As a rule, the distances to their neighbors or else measurement features situated further away will also differ. A further option consists of considering the areas enclosed with other measurement features. If one or more 3-D identification features are assigned to a measurement feature in this way, then these assigned 3-D identification features can render the measurement feature unique. The 3-D identification features as it were imply a coding of the measurement feature, without the latter needing to be encoded when considered on its own.

Step 103: "Assigning the Measurement Features in the Image Recordings from all Measurement Positions"

In step 102, the measurement features were assigned specific 3-D identification features in the various individual measurements. This is now utilized in the subsequent step 103 in order to identify a respective measurement feature in the image recordings from different measurement positions.

For example, a measurement feature M1 has a neighboring adjacent measurement feature at a distance of 5 cm, a further measurement feature at a distance of 18 cm, and a third at a distance of 27 cm. Should a measurement feature with neighboring measurement features at these distances be found in another individual measurement, it can be assumed that this is the same measurement feature M1. It can be identified accordingly and labeled in the image recordings. As a result, an identified measurement feature is uniquely characterized in the plurality of image recordings, even if this was a priori a non-coded measurement feature.

Step 104: "Calculating the 3-D Coordinates of the Measurement Features"

In this step 104, the 3-D coordinates of the measurement features are determined in a global coordinate system. Knowledge about the 3-D coordinates of the measurement features in the sensor coordinate system is not assumed. The determination of the 3-D coordinates in the global coordinate system is based on the identification, carried out in step 103, of measurement features in the available image recordings and their 2-D coordinates in these image recordings. The global 3-D coordinates can be calculated with a bundle adjustment.

3-D identification features cannot, or need not, be determined for all measurement features in step 102. A cause of this might lie in the fact that the measurement feature was only located in the field of view of one individual camera. In an advantageous embodiment of the method, these measurement features are nevertheless included in the bundle adjustment in step 104. For example, this may have a positive effect on the accuracy of the determination of the 3-D coordinates.

What is claimed is:

1. A method for photogrammetrically measuring measurement features with a device having a multi-camera, the multi-camera having at least two individual cameras securely connected to one another, with a field of view of at least two of the individual cameras at least partially overlapping, the method comprising:

(a) recording images of the measurement features with at least two individual cameras of the multi-camera in different measurement positions;

(b) evaluating the image recordings of a measurement position and, in three-dimensional space, determining three-dimensional (3-D) identification features of measurement features located within a region of overlap of the individual cameras with an aid of a plurality of image recordings for an overlap region and a respective pose of the measurement features in the plurality of image recordings, wherein the measurement features are uncoded markers that are not unambiguously identifiable based on their configuration, wherein the 3-D identification features are calculated between the measurement features, and wherein the measurement features in the measurement images are unambiguously identified based on the calculated 3-D identification features;

(c) identifying the measurement features present in the plurality of image recordings with corresponding 3-D identification features recorded from various measurement positions; and (d) calculating the 3-D coordinates of the measurement features with the aid of the plurality of image recordings, wherein the 3-D coordinates are determined in a mathematical fitting using the 2-D image coordinates of the measurement features and their unambiguous identification.

2. The method as claimed in claim 1, wherein the measurement features are uncoded markers, such that the measurement features are not identifiable unambiguously or not identified unambiguously based on their configuration but instead 3-D identification features between the measurement features are calculated for the measurement features in an overlapping field of view based on the measurement images and a known configuration of recording units, wherein the measurement features can be identified unambiguously in the measurement images based on the 3-D identification features, and wherein the 3-D coordinates of the measurement features are determined with mathematical fitting using 2-D image coordinates of the measurement features in a respective image recording and their unambiguous identification.

3. The method as claimed in claim 1, wherein the 3-D identification features that are determined are at least one of distances, angles, and enclosed areas between the measurement features.

4. The method as claimed in claim 1, wherein coded markers are additionally used for the identification of the measurement features.

5. The method as claimed in claim 1, wherein a bundle adjustment is implemented in step (d) when the 3-D coordinates of the measurement features are calculated.

6. The method as claimed in claim 1, wherein additionally at least one scale-providing element is introduced, at least one dimension of which is known sufficiently accurately and at least one dimension of which is taken into account by an evaluation apparatus within the scope of a bundle adjustment in order to determine the scaling of resultant 3-D positions of markers more accurately.

7. The method as claimed in claim 6, wherein the scale-providing element is an element having at least two uncoded markers, and the sufficiently known dimension is at least one spacing of these uncoded markers, wherein the uncoded markers are configured such that the uncoded markers cannot be identified unambiguously and cannot be distinguished unambiguously from other markers on an object, and wherein the dimensions taken into account by the evaluation apparatus within the scope of the bundle adjustment are identified by virtue of being known.

8. The method as claimed in claim 6, wherein the scale-providing element is an element having at least two markers, or coded markers, and the sufficiently known dimension is at least one spacing of the markers, and wherein the markers are configured such that the markers can be identified unambiguously.

9. The method as claimed in claim 1, wherein not only identified measurement features from an overlapping field of view of the cameras are taken into account in a bundle adjustment, but the measurement features which were recorded outside of the overlapping field of view in measurement images are also taken into account in the bundle adjustment, and their 3-D positions are calculated.

10. A device for three-dimensional optical measurement of measurement features, the device comprising:

a multi-camera with at least two cameras securely connected to one another; and an evaluation unit, wherein a configuration with respect to one another is sufficiently accurately known for at least two of the cameras, wherein at least two of the cameras are configured to record measurement images of measurement features, wherein the measurement features are uncoded markers that are not unambiguously identifiable based on their configuration, wherein the 3-D identification features are calculated between the measurement features, wherein the measurement features in the measurement images are unambiguously identified based on the calculated 3-D identification features, wherein the fields of view of the cameras used for image recording of the measurement features overlap, wherein the evaluation unit is configured to calculate the 3-D coordinates of the measurement features with the method as claimed in claim 1, wherein the 3-D coordinates are determined in a mathematical fitting using the 2-D image coordinates of the measurement features and their unambiguous identification, and wherein a bundle adjustment is performed.

11. The device as claimed in claim 10, wherein the multi-camera is rigidly connected to a 3-D scanner.

12. The device as claimed in claim 11, wherein the 3-D scanner is configured to capture three-dimensional measurement data and at least partly uses the measurement features, and wherein the 3-D positions of the said measurement features are calculated by the evaluation unit.

13. The device as claimed in claim 11, wherein the 3-D scanner and the multi-camera jointly use at least one individual camera.

14. The device as claimed in claim 13, wherein the 3-D scanner and the multi-camera use different working distances in the jointly used individual cameras.

15. The device as claimed in claim 14, wherein the 3-D scanner uses a shorter working distance than the multi-camera.

16. The device as claimed in claim 11, wherein the 3-D scanner and the multi-camera use light at different wavelengths in their illuminations or projections.

17. The device as claimed in claim 16, wherein the 3-D scanner uses a projection with a blue wavelength, and the multi-camera uses an illumination with a red or infrared wavelength.

18. The device as claimed in claim 11, wherein the 3-D scanner is a topometric sensor.

19. The device as claimed in claim 18, wherein the topometric sensor is a structured-light scanner or a laser line scanner.

20. The device as claimed in claim 11, wherein at least one camera is equipped with an illumination unit configured to illuminate the measurement features in an immediate vicinity of the optics of the camera, and wherein the measurement features are markers made of a retroreflective material.

* * * * *